W. C. HUEBNER.
APPARATUS FOR PRODUCING PHOTOGRAPHIC PRINTS UPON CYLINDERS.
APPLICATION FILED JAN. 29, 1908. RENEWED APR. 11, 1911.
1,011,199.
Patented Dec. 12, 1911.
4 SHEETS—SHEET 2.
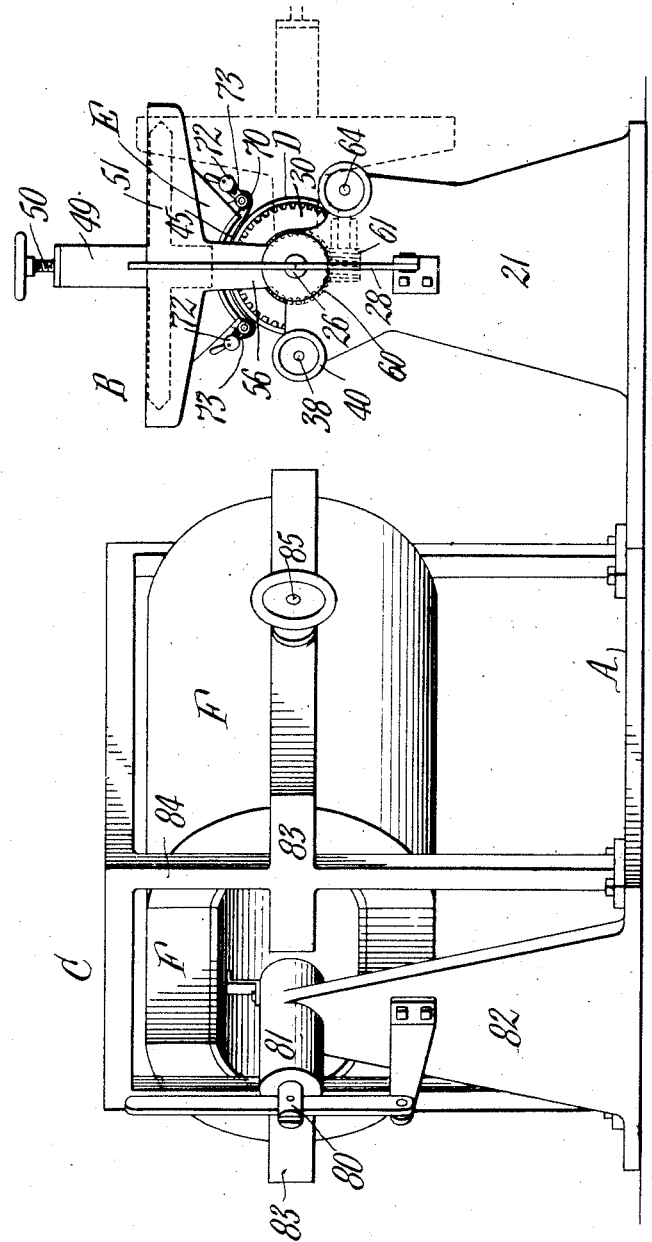
Witnesses:
E. A. Volk.
A. G. Dimond.
Inventor.
William C. Huebner,
By Wilhelm, Parker & Hard,
Attorneys.

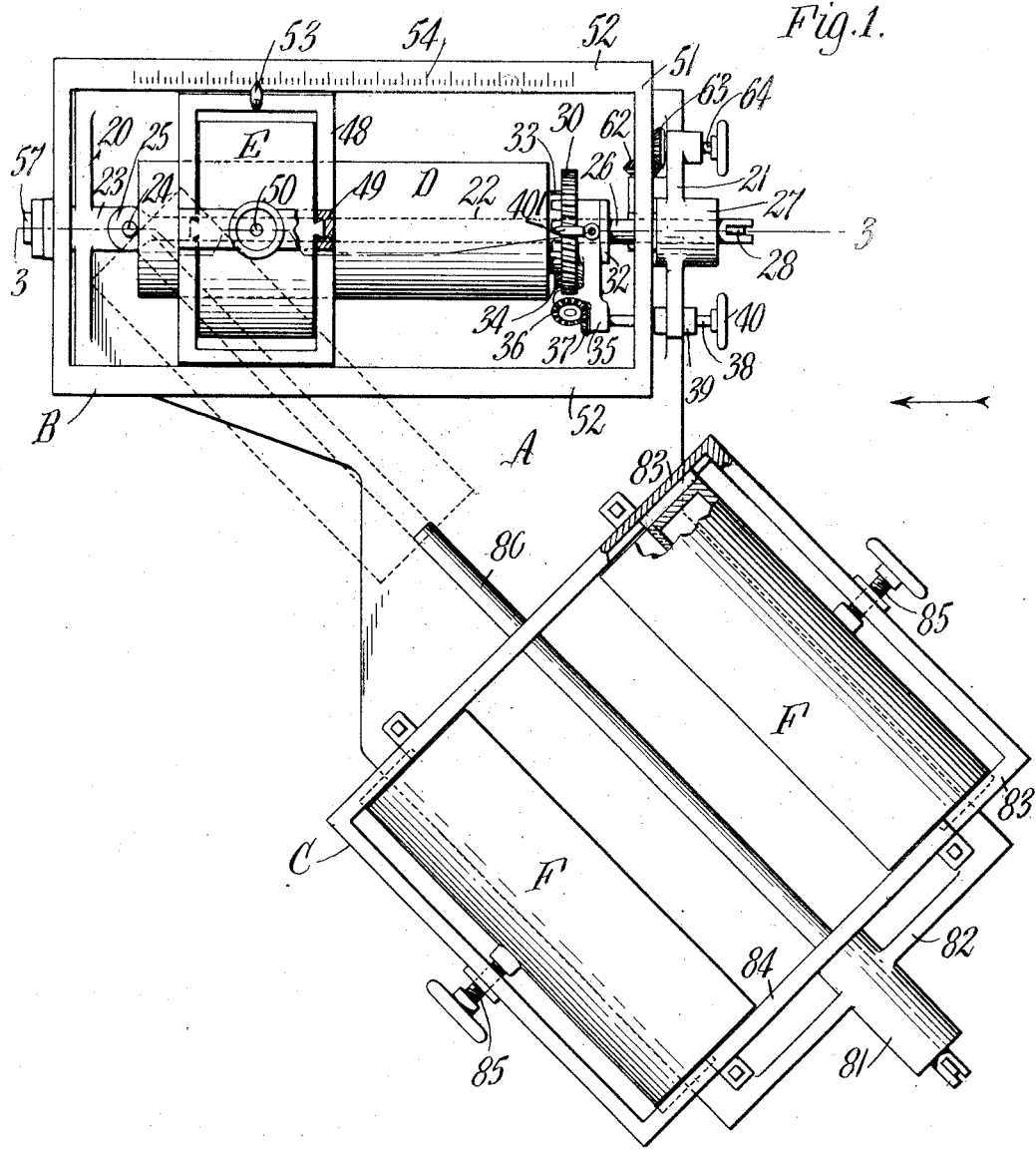

W. C. HUEBNER.
APPARATUS FOR PRODUCING PHOTOGRAPHIC PRINTS UPON CYLINDERS.
APPLICATION FILED JAN. 29, 1908. RENEWED APR. 11, 1911.
1,011,199.
Patented Dec. 12, 1911.
4 SHEETS—SHEET 3.
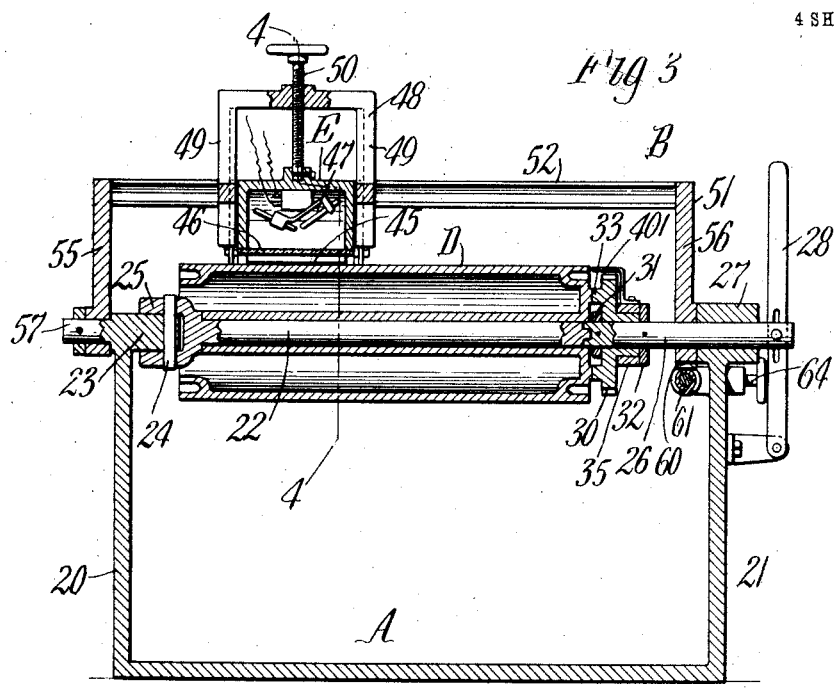
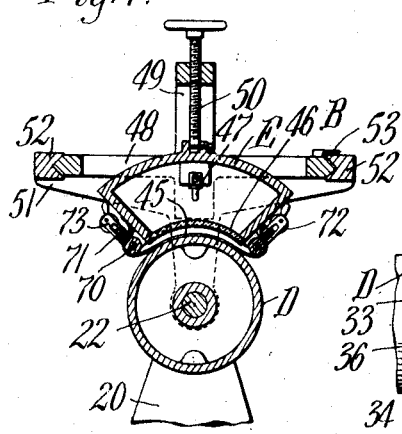
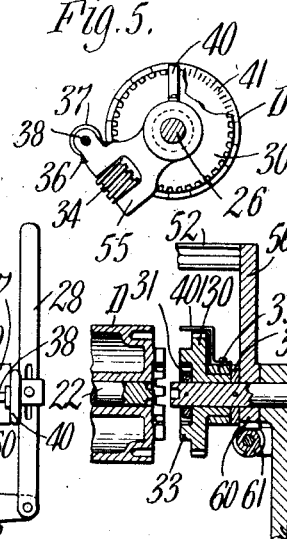
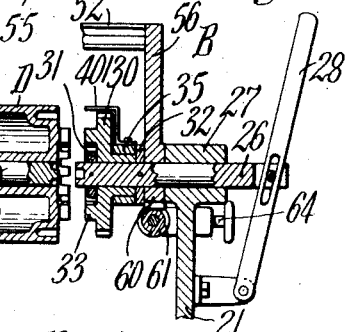
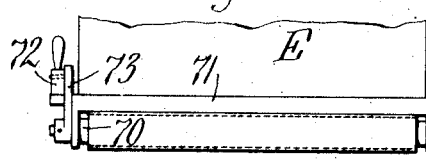
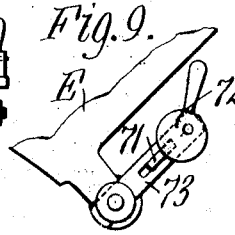
Witnesses:
E. A. Volk.
A. G. Dimond
Inventor.
William C. Huebner,
By Wilhelm, Parker & Hard,
Attorneys.

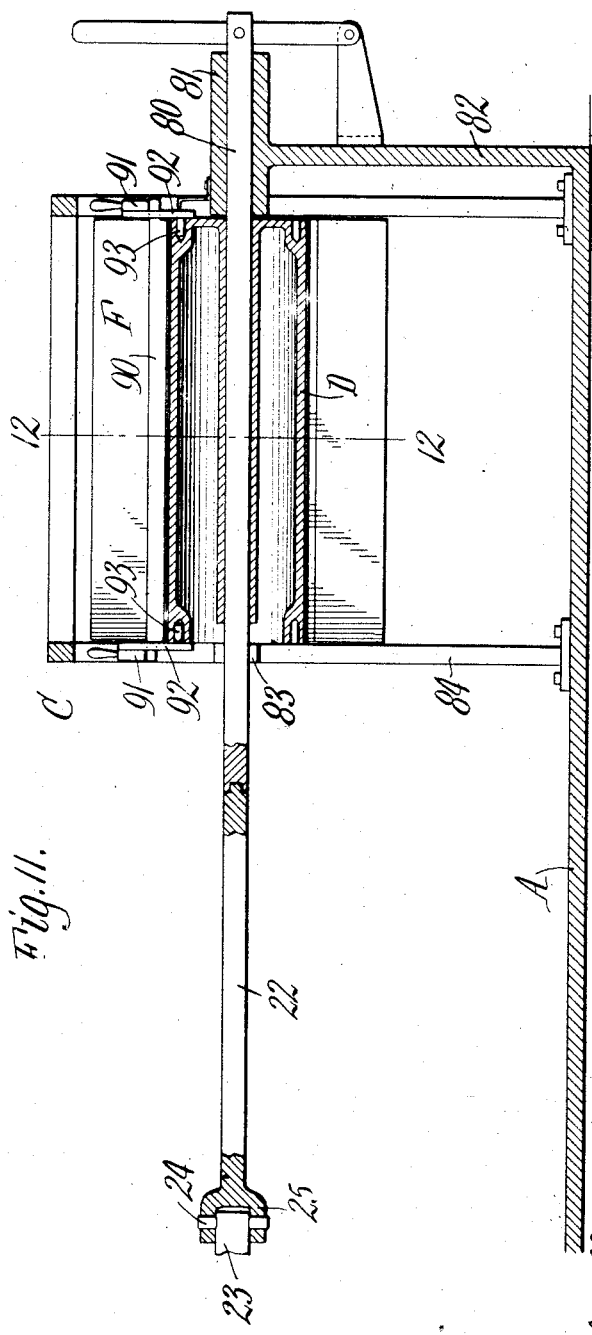

UNITED STATES PATENT OFFICE.

WILLIAM C. HUEBNER, OF BUFFALO, NEW YORK, ASSIGNOR OF ONE-HALF TO GEORGE BLEISTEIN, OF BUFFALO, NEW YORK.

APPARATUS FOR PRODUCING PHOTOGRAPHIC PRINTS UPON CYLINDERS.

1,011,199. Specification of Letters Patent. Patented Dec. 12, 1911.

Application filed January 29, 1908, Serial No. 413,196. Renewed April 11, 1911. Serial No. 620,462.

*To all whom it may concern:*

Be it known that I, WILLIAM C. HUEBNER, a citizen of the United States, residing at Buffalo, in the county of Erie and State of New York, have invented a new and useful Improvement in Apparatus for Producing Photographic Prints upon Cylinders, of which the following is a specification.

This invention relates to an apparatus for producing photographic prints upon sensitized surfaces of cylinders or rollers, such, for instance, as are used as printing rollers or cylinders in the manufacture of wall paper and for other purposes.

The object of the invention is to provide a simple and efficient apparatus by means of which photographic prints can be readily and cheaply produced upon a sensitized cylindrical surface in the desired position, arrangement or register.

The apparatus comprises, briefly stated, a frame having a longitudinal support or arbor upon which the sensitized cylinder or roller is placed, a chamber, case or carrier which contains suitable illuminating apparatus and which is provided with a transparent concave face plate adapted to press a flexible printing film or sheet against the sensitized cylindrical surface, and means for adjusting the illuminating chamber or case and the sensitized cylinder with reference to each other so that the printing film or sheet is applied exactly to that portion of the sensitized surface upon which the print is to be made.

When the matter to be printed consists partly of pictures, designs or illustrations and partly of type matter, it is often desirable to print all of this matter from the same cylinder or roller and in that case the pictures, designs or illustrations are first printed upon the sensitized surface in a primary apparatus and the type matter is afterward applied to the sensitized surface in a secondary apparatus to which the sensitized cylinder is removed from the primary apparatus.

In the accompanying drawings, consisting of four sheets: Figure 1 is a top plan view of the primary and secondary apparatus. Fig. 2 is an elevation viewed in the direction of the arrow, Fig. 1. Fig. 3 is a vertical longitudinal section of the primary printing apparatus in line 3—3, Fig. 1. Fig. 4 is a vertical transverse section in line 4—4, Fig. 3. Fig. 5 is a rear elevation, partly in section, of the mechanism for turning the cylinder on the arbor, the section being taken in line 5—5, Fig. 6. Fig. 6 is a fragmentary elevation of the rear portion of the primary apparatus, showing the sliding arbor engaged with the pivoted arbor. Fig. 7 is a fragmentary vertical section of the same parts, showing the sliding arbor disengaged from the hinged arbor. Fig. 8 is an elevation, at right angles to Fig. 4, of the film clamping mechanism attached to the illuminating chamber, on a larger scale. Fig. 9 is an elevation of the film clamping mechanism, at right angles to Fig. 8, on an enlarged scale. Fig. 10 is a rear elevation, partly in section, of the mechanism for turning the frame in which the illuminating chamber is mounted, the section being taken in line 10—10, Fig. 6. Fig. 11 is a longitudinal sectional elevation of the secondary printing apparatus. Fig. 12 is a transverse section in line 12—12, Fig. 11. Fig. 13 is a longitudinal section in line 13—13, Fig. 12, showing the film clamping mechanism, on an enlarged scale. Fig. 14 is an elevation of the film clamping mechanism at right angles to Fig. 13.

Like reference characters refer to like parts in the several figures.

Referring to Figs. 1—10, A represents a base plate upon which both the primary printing apparatus B and the secondary printing apparatus C are mounted. The primary printing apparatus is supported on two standards or end frames 20 21 rising from this base plate. The standard 20 carries at its upper end the horizontal main arbor 22 upon which the sensitized roller or cylinder D is placed. This arbor is attached to the head 23 of the standard 20 by a vertical pivot 24 which passes through the bifurcated end 25 of the arbor and permits the latter to be swung to one side, as represented by dotted lines in Fig. 1. The free end of the pivoted arbor 22 is supported by a sliding or locking arbor 26 which is arranged in the head 27 of the standard 21 and can be moved toward and from the free end of the pivoted arbor by a lever 28. The sliding arbor interlocks with the pivoted arbor by any suitable means, for instance, a projection on one part entering a socket in the other, as shown.

The sliding arbor carries upon its inner portion the mechanism for adjusting the cylinder circumferentially upon the pivoted arbor and holding the cylinder in its adjusted position. This mechanism comprises the following parts: 30 represents a worm wheel which is rotatably mounted upon the sliding arbor between collars 31 and 32 secured thereto so that this wheel takes part in the axial movement of the sliding arbor. This wheel is provided on its inner side with clutch teeth 33 by which it interlocks with teeth on the end of the roller or cylinder D, Fig. 2. 34 represents a worm which meshes with the wheel 30 and is journaled in a frame 35 which embraces the hub of the wheel 30 and partakes of the axial movement of this wheel and the sliding arbor. The shaft of this worm is provided with a bevel wheel 36 which meshes with a bevel wheel 37 on the inner end of a longitudinal shaft 38 journaled in the frame 35 and arranged slidably and rotatably in a bearing 39 on the standard 21, Figs. 1 and 6. This longitudinal shaft is provided at its outer end with a hand wheel 40 for turning the shaft and through it the worm and worm wheel, thereby turning the roller or cylinder on the arbor. The position of the cylinder in a circumferential direction can be observed by reference to a pointer 401, secured to the frame 35, and a graduation 41 on the end of the cylinder, Fig. 5.

E represents the illuminating chamber or case and 45 the flexible printing film or sheet which is arranged between the transparent concave face plate 46 of the chamber and the sensitized surface of the roller or cylinder, Figs. 3 and 4. This chamber contains suitable electric illuminating apparatus 47 and is so mounted that it can be adjusted lengthwise of the cylinder for adjusting the position of the printing film or sheet, and can be moved toward and from the cylinder for pressing the film or sheet closely against the latter and removing it therefrom.

The chamber is mounted in a carriage 48 having radial guides 49 between which the chamber can be moved toward and from the cylinder by a screw 50, and this carriage is mounted in a carrier frame 51 having its longitudinal members 52 provided with guides between which the carriage can be moved lengthwise of the cylinder. The longitudinal position of the carriage can be observed by a pointer 53 on the carriage and a graduation 54 on the frame. The latter has end pieces 55 56 which are pivoted to the standards 20 21 concentric with the arbor of the cylinder. As shown in Fig. 3, the end piece 55 is journaled on an axial stud 57 on the head of the standard 20 and the end piece 56 on the sliding arbor 26 at the inner side of the standard 21. The rectilinear and radial adjustment of the light chamber toward and from the sensitized cylindrical surface causes the concave face plate to press the film closely and uniformly against the cylinder over the entire surface of the face plate and insures a uniform printing effect over the entire extent of the film.

The carrier frame can be adjusted concentric with the axis of the cylinder and for this purpose the end piece 56 is provided with a gear segment 60, Figs. 2, 3, 6, 7, and 10, which is engaged by a worm 61 journaled in the standard 21 and provided with a bevel wheel 62 which meshes with a bevel wheel 63 on a longitudinal hand shaft 64, Figs. 1, 2, 3 and 7. By turning this hand shaft the carrier frame can be swung to different positions about the cylinder, as indicated by the full and dotted lines in Fig. 2.

In multi-color printing each cylinder prints one color and the various prints on each cylinder must register exactly with all the corresponding prints on the other cylinders. In order to produce these prints upon the different cylinders the film is changed for each cylinder, and in order to produce the prints in correct register each film must be accurately adjusted on the face plate. This is done most conveniently by swinging the carrier of the light chamber to a position in which the face plate stands approximately in a perpendicular position, shown by dotted lines in Fig. 2, and swinging the cylinder support out of the way.

The transparent face plate of the chamber has the form of a cylindrical segment of the proper radius or shape to fit closely against the cylinder. The flexible printing film or sheet is arranged across the concave face of this face plate and is secured to the carrier at both ends of the face plate by any suitable means, for instance, as shown in Figs. 2, 4, 8, and 9, by a clamping mechanism comprising a roller 70 which is supported on the chamber and around which the end portion of the flexible sheet or film is drawn, a clamping bar 71 which presses the sheet or film against the roller, and eccentrics or cams 72 by which the bar is tightened against the sheet and roller. The bar slides in slotted brackets 73 which are secured to the chamber and to which the eccentrics or cams are pivoted.

For mounting the sensitized cylinder in the apparatus, the main or pivoted arbor is released by withdrawing the sliding or locking arbor therefrom, Fig. 7, and the pivoted arbor is swung to one side. The cylinder is then placed on the pivoted arbor, the latter is swung back into line with the sliding arbor and this arbor is moved into engagement with the pivoted arbor, Figs. 1, 3 and 6. The illuminating chamber and the cylinder are now adjusted so that the film or sheet stands opposite that portion of the cylinder upon which the print is to be made, and for this purpose the devices for adjusting the cylinder about its arbor and for adjusting the carrier lengthwise of the cylinder and also concentrically with the cylinder are resorted to as may be necessary or desirable. When the chamber and cylinder have been so adjusted the chamber is pressed against the cylinder, whereby the flexible film or sheet is applied closely to the sensitized cylindrical surface. The exposure is then made, the chamber and film withdrawn from the cylinder and the latter removed from the apparatus and finished for printing in any suitable or well known manner.

When several prints are to be made in circumferential succession upon the same cylinder the operation is repeated after the cylinder has been properly adjusted. The concave face plate of the chamber covers only a portion of the circumference of the cylinder and a corresponding number of prints of the same kind can be made upon the cylinder in succession by adjusting the cylinder circumferentially for each print. The entire surface of the cylinder can be covered in an obvious manner with the desired design or pattern as required, for instance, in preparing printing rollers or cylinders for wall paper. When several rollers or cylinders are to be provided with the same design for printing the same in different colors, the prints are readily made upon all the cylinders of the same set in correct register by reference to the pointers and graduations. When different designs are to be printed upon the same cylinder, the film or sheet is replaced as required and the chamber and cylinder properly adjusted for each new position.

Referring to Figs. 1, 2, 11–14, the secondary printing apparatus C is provided with a sliding horizontal arbor 80 which is supported in a bearing 81 carried by a standard 82 rising from the bed plate A. This arbor is arranged radially with reference to the pivot of the main arbor 22 of the primary apparatus, so that this pivoted arbor can be swung to a position in which it is in line with the arbor of the secondary printing apparatus, as shown by dotted lines in Fig. 1. The secondary printing apparatus is arranged at such a distance from this pivot that the sliding arbor 80 can be interlocked with the pivoted arbor 22, as shown in Fig. 11, the arbors being provided with an interlocking projection and socket. When the two arbors have been so interlocked the cylinder D can be moved from the arbor 22 of the primary apparatus and upon the arbor 80 of the secondary apparatus, as represented in Fig. 11.

The secondary apparatus is provided with two illuminating chambers F F, each of which embraces nearly one-half of the cylinder. These chambers are movable toward and from the cylinder between diametrically arranged guides 83 on the frame 84 and are pressed toward the cylinder by screws 85. Each chamber is provided with a concave face plate 86 and electric illuminating devices 87. The type matter or other matter which is to be printed upon the cylinder in the secondary apparatus may be applied to a film or flexible sheet 88 which extends around the cylinder and has its end portions secured by a longitudinal clamping bar 90 which is arranged between the chambers on one side of the cylinder. This bar is pressed against the ends of the film, clamping the latter against the cylinder, by any suitable mechanism, for instance, cams or eccentrics 91 which are pivoted to brackets 92 attached to the cylinder by studs 93 entering sockets in the ends of the cylinder.

When the cylinder has been exposed in the primary and secondary apparatus it is finished for printing in any suitable or well known manner.

I claim as my invention:

1. The combination with a support for a sensitized cylinder, of an illuminating chamber adapted to press a printing film or sheet against the sensitized cylindrical surface, and means for changing the position of said chamber circumferentially with reference to said cylinder, substantially as set forth.

2. The combination with a support for a sensitized cylinder and an illuminating chamber adapted to press a printing film or sheet against the sensitized cylindrical surface, of means for adjusting said cylinder circumferentially, and means for changing the position of said chamber circumferentially with reference to the cylinder, substantially as set forth.

3. The combination with a support for a sensitized cylinder, of an illuminating chamber adapted to press a printing film or sheet against the sensitized cylindrical surface, means for adjusting said cylinder circumferentially, means for changing the position of said chamber circumferentially with reference to said cylinder, and means for adjusting said chamber lengthwise of said cylinder, substantially as set forth.

4. The combination with a supporting frame, of a longitudinal arbor for supporting a sensitized cylinder, a pivotal connection between said arbor and frame, and an illuminating chamber adapted to press a printing film or sheet against the cylinder, substantially as set forth.

5. The combination with a supporting frame, of a longitudinal arbor for supporting a sensitized cylinder, a pivotal connection between said arbor and frame, an illuminating chamber adapted to press a printing film or sheet against the cylinder, and means for changing the position of the chamber circumferentially with reference to the cylinder, substantially as set forth.

6. The combination with a support for a sensitized cylinder, of an illuminating chamber having a transparent concave face plate, and clamping rollers and bars mounted on said chamber for securing a printing film or sheet across said plate, substantially as set forth.

7. The combination with a supporting frame, of a longitudinal arbor for supporting a sensitized cylinder, longitudinal guides supported by said frame, a carriage adjustable in said longitudinal guides and having radial guides, an illuminating chamber movable in said radial guides, and means for pressing said chamber toward said arbor, substantially as set forth.

8. The combination with a supporting frame, of a longitudinal arbor for supporting a sensitized cylinder, a carrier frame having longitudinal guides and adjustable about the axis of said arbor, a carriage adjustable in said longitudinal guides and having radial guides, an illuminating chamber movable in said radial guides, and means for pressing said chamber toward said arbor, substantially as set forth.

9. The combination with a supporting frame, of a longitudinal arbor for supporting a printing cylinder, said arbor being pivoted at one end to said frame, and a sliding arbor mounted in said frame and adapted to support the free end of said pivoted arbor, substantially as set forth.

10. The combination with a supporting frame, of a longitudinal arbor for supporting a printing cylinder, said arbor being pivoted at one end to said frame, a sliding arbor mounted in said frame and adapted to support the free end of said pivoted arbor, and means mounted on said sliding arbor for rotating said cylinder, substantially as set forth.

11. The combination with a supporting frame, of a longitudinal arbor for supporting a printing cylinder, said arbor being pivoted at one end to said frame, a sliding arbor mounted in said frame and adapted to support the free end of said pivoted arbor, a worm wheel mounted on said sliding arbor and adapted to engage said printing cylinder for rotating the same, a worm meshing with said wheel, and means for rotating said worm, substantially as set forth.

12. The combination of a primary and a secondary apparatus for producing prints upon a cylinder, and means for moving the cylinder from the primary to the secondary apparatus, substantially as set forth.

13. The combination of a primary and a secondary apparatus for producing prints upon a cylinder, each apparatus comprising a support for the cylinder, the support of one apparatus being movable so that it can be placed in line with the cylindrical support of the other apparatus, substantially as set forth.

14. The combination of a primary and a secondary apparatus for producing prints upon a cylinder, one apparatus comprising a pivoted arbor for supporting the cylinder which can be placed in line with the arbor of the other apparatus, substantially as set forth.

15. The combination of a primary and a secondary apparatus for producing prints upon a cylinder, one apparatus comprising a pivoted arbor for supporting the cylinder, and the other apparatus comprising a sliding arbor with which said pivoted arbor can be alined, substantially as set forth.

16. The combination with a support for a sensitized cylinder, of a plurality of illuminating chambers provided with concave face plates and adapted conjointly to press a printing film or sheet against said cylinder, and means for adjusting each chamber radially toward and from the cylinder, substantially as set forth.

Witness my hand in the presence of two subscribing witnesses.

WILLIAM C. HUEBNER.

Witnesses:
EDWARD WILHELM,
C. B. HORNBECK.